United States Patent
Hatz et al.

(10) Patent No.: US 6,710,494 B2
(45) Date of Patent: Mar. 23, 2004

(54) POWER GENERATING INSTALLATION THAT COMPRISES A GENERATOR AND A RECIPROCATING INTERNAL COMBUSTION ENGINE AS DRIVE

(75) Inventors: Ernst Hatz, Ruhstorf/Rott (DE); Franz Moser, Schardenberg (AT)

(73) Assignee: Motorenfabrik Hatz GmbH & Co. KG, Ruhstorf/Rott (DE)

( * ) Notice: Subject to any disclaimer, the term of this patent is extended or adjusted under 35 U.S.C. 154(b) by 61 days.

(21) Appl. No.: 09/937,535

(22) PCT Filed: Mar. 2, 2001

(86) PCT No.: PCT/EP01/02367

§ 371 (c)(1), (2), (4) Date: Dec. 28, 2001

(87) PCT Pub. No.: WO01/65661

PCT Pub. Date: Sep. 7, 2001

(65) Prior Publication Data

US 2002/0153793 A1 Oct. 24, 2002

(30) Foreign Application Priority Data

Mar. 2, 2000 (DE) .......................... 100 10 248

(51) Int. Cl.[7] .............................................. H02K 21/12
(52) U.S. Cl. ............................. 310/156.53; 310/156.56
(58) Field of Search ..................... 310/156.01, 156.08, 310/156.28, 156.53, 156.56, 156.63, 156.65, 152, 153, 74; 322/4; 290/1 A, 1 B

(56) References Cited

U.S. PATENT DOCUMENTS

| 4,137,884 A | | 2/1979 | Odazima et al. ........ 123/169 D |
| 4,742,258 A | | 5/1988 | Earle et al. ............. 310/156.53 |
| 4,795,936 A | * | 1/1989 | Crosetto et al. ........ 310/156.53 |
| 5,796,195 A | * | 8/1998 | Miyakawa ................. 310/68 B |
| 5,955,807 A | * | 9/1999 | Kajiura et al. ......... 310/156.66 |
| 6,144,130 A | * | 11/2000 | Kawamura ............. 310/156.28 |
| 6,218,753 B1 | * | 4/2001 | Asano et al. ........... 310/156.53 |

FOREIGN PATENT DOCUMENTS

| DE | 44 18 454 A1 | 11/1995 |
| JP | 9-121485 | 5/1997 |

* cited by examiner

Primary Examiner—Dang Le
(74) Attorney, Agent, or Firm—Katten Muchin Zavis Rosenman

(57) ABSTRACT

In a power generator unit composed of a generator and a piston internal combustion engine as the drive, particularly a synchronous generator and a diesel engine, with permanent magnets arranged in the rotor of the generator, in the area of the poles, for its excitation, and a rotor winding (28) in the stator, holder pockets (34) that are open at least on one side are formed in the pole regions of the rotor (29), in the axial direction, which border on the air gap (33) formed with the stator (11) with a cylindrical circumference wall (50); the permanent magnets of the pole regions are each formed by a plurality of magnet elements (35), which are arranged next to one another within the holder pockets (34) in the circumference direction.

15 Claims, 5 Drawing Sheets

Figure 1:
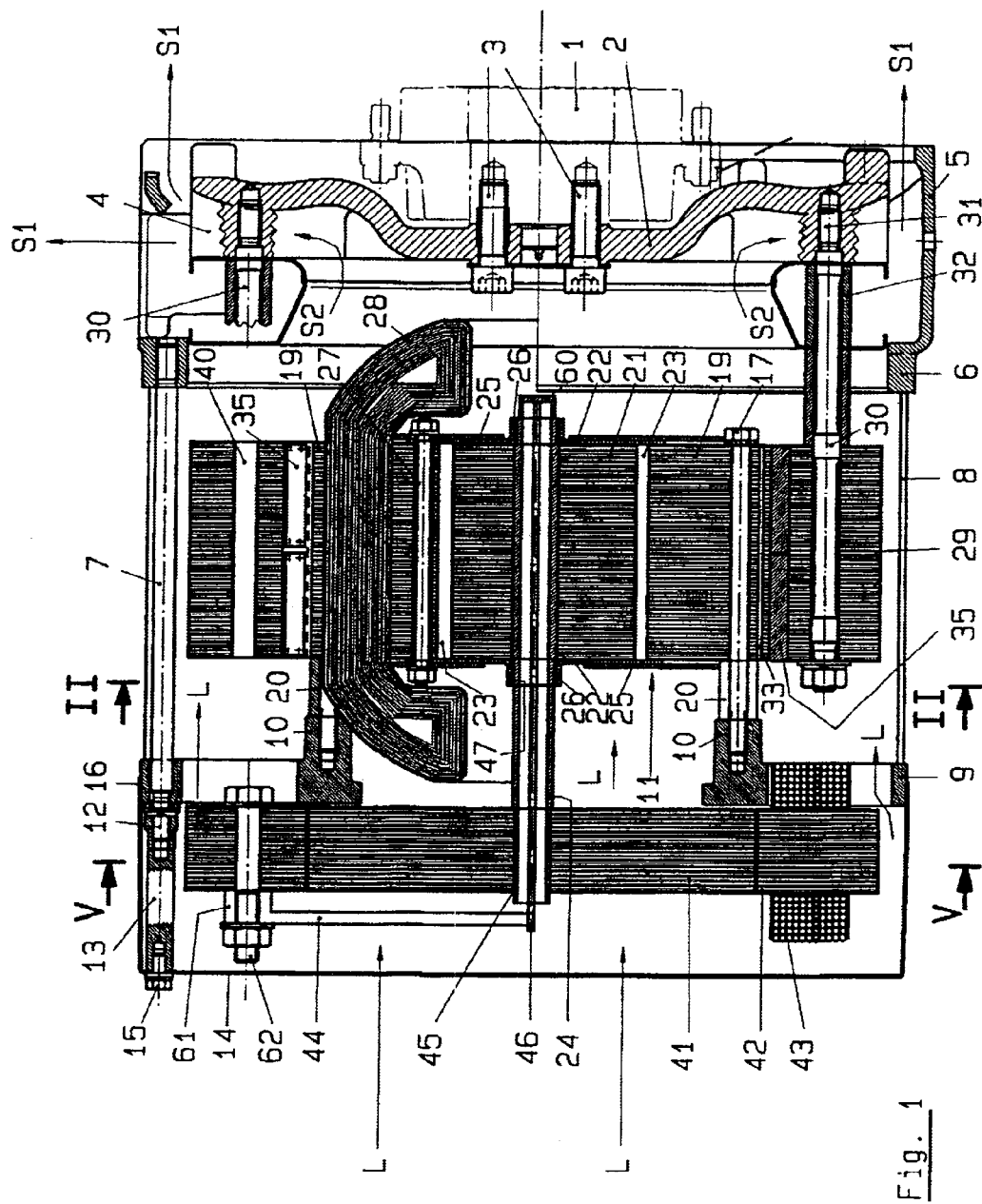

POWER GENERATING INSTALLATION THAT COMPRISES A GENERATOR AND A RECIPROCATING INTERNAL COMBUSTION ENGINE AS DRIVE

The invention relates to a power generator unit composed of a generator and a piston internal combustion engine as the drive, particularly composed of a synchronous generator and a diesel engine, with permanent magnets arranged in the rotor of the generator, in the area of the poles, for its excitation, and a rotor winding in the stator.

Such a power generator unit, combined with a pump unit, is described in DE 19721527.

Permanently excited electrical machines usually possess permanent magnets that consist of one piece per pole. In the known generator, each permanent magnet possess the shape of a cylinder mantle segment, which borders the air gap formed with the stator, in the region of the poles.

Such permanent magnet shells are not easy to produce in economically efficient manner, at least not in a size that is suitable for generators with an output of more than five kVA. The installation of such one-piece permanent magnets is only possible in the non-magnetized state, because of the great magnetic forces that preclude any normal handling. Magnetization must then be performed on the completely assembled rotor, which is a complicated process. During the transport of such large permanent magnets, there is also the risk of breakage, because of their brittle material properties.

In contrast, the present invention is based on the task of creating an economically efficient solution for fitting the rotor of the generator, in the power generator unit mentioned initially, for the purpose of magnetic excitation of the generator and, in particular, of avoiding the aforementioned disadvantages.

This task is accomplished, with regard to the production of the permanent magnets as well as with regard to their installation in the rotor of a power generator unit as stated initially, in accordance with the characteristic of claim 1.

Because the permanent magnets are formed by a plurality of relatively small magnet elements, according to a proposal of the invention, on the one hand, it becomes possible to produce them in economically efficient manner. Such elements are not only easy to transport and easy to produce in the magnetized state, but can also be installed in simple manner. For this purpose, they are individually arranged in suitable holder pockets of the rotor, next to one another in the circumference direction, with their poles aligned the same way. These pockets are structured to be open on one or both sides, viewed in the axial direction, so that it is possible to fit the magnet elements into them from one or both faces of the rotor. Holder pockets structured to be continuous in the axial direction and open make it possible, as an advantageous embodiment, for the magnet elements to be arranged in at least two rows, in the axial direction, in the holder pockets. In this connection, there is the possibility of adapting the magnetic flow to be achieved to any desired design, by way of the magnet elements, by choosing their size and shape, number, and arrangement accordingly. For this purpose, the magnet elements can be arranged more or less close to one another; they can be arranged in one or in two or even in several rows, in the axial direction. In connection with their size, the radial thickness, which significantly determines the density of the magnetic flow, must be taken into particular consideration. In contrast, the length and the width of the magnet elements are non-critical for the magnetic resistance. Instead, the latter is dependent not only on the radial dimension of the magnet elements, but also even more on their number, i.e. on the arc length of the holder pockets fitted with magnet elements. In addition, the level of the exciter voltage can also be easily changed in that a small number of magnet elements with the same size and shape is moved, so that more or less large gaps between adjacent magnet elements are formed. These can be filled with replacement pieces made of plastic, if necessary, which take on the role of filling the space.

As far as the shape of the magnet elements is concerned, it can be practical to determine their length in accordance with the axial dimension of the rotor, e.g. in that the axial width of the rotor corresponds to a multiple, e.g. about twice the length of a magnet element.

With regard to their cross-section structure, the magnet elements can be structured as ring segments or rectangular, for example. In the latter case, it is advantageous if the radial inside surfaces of the holder pockets are structured in polygon shape, adapted to the segments, so that the block-shaped magnet elements rest against the polygon surfaces with their large surfaces, in each instance.

To improve the installation of the magnet elements, an advantageous further development consists of the fact that at least on the inside surface of the holder pockets that lies opposite the circumference wall, ribs are provided that run axially and define the distances between adjacent magnet elements.

The magnet elements are held in place in their installation position, in each instance, as a result of the great magnetic forces. However, it can also be practical to attach the magnet elements on the inside surface of the holder pockets by gluing them in place, in addition, or to cover the holder pockets with corresponding lids made of metal or plastic at their faces that lie axially opposite.

Also to simplify the installation, or for considerations of statics, it can be practical to divide the holder pockets into individual drawers that each correspond to approximately the cross-section of a magnet element, by means of partitions that run axially.

The magnet elements are arranged in the rotor of the generator. In this connection, the rotor can be structured as an external rotor, according to the invention. Vice versa, however, the rotor with the magnet elements can also be structured as an internal rotor, where the rotor winding is then located in the stator, which is arranged on the outside.

In order to prevent the edge-side magnet elements from becoming unusable as a result of magnetic reversal in the case of a so-called surge short-circuit, a deflection of the magnetic flow is provided, according to the invention, in such a way that the holder pockets are extended in the circumference direction, on both sides, going beyond the magnet element, in each instance. This prevents the permanent magnets from being demagnetized.

With the holder pockets for the magnet elements provided according to the invention, there is the possibility of simple installation of the magnet elements, which can be positioned almost without any force, as a result of the magnetic ground. In addition, it can be practical to use a magnetic field influence during installation; for this purpose, it can be provided, according to another proposal according to the invention, that a stator is positioned inside the rotor during installation, to which current is applied during the installation, in such a way that positioning of the magnet elements can take place essentially without any force. In this way, installation difficulties resulting from strong repulsion forces between the magnet elements are avoided. With this interaction of the structure of the holder pockets, on the one hand, and fitting them with permanent magnets in the form of small magnet elements, on the other hand, an economically efficient way was found to implement such power generator units with a permanently excited synchronous generator.

Figure 2:
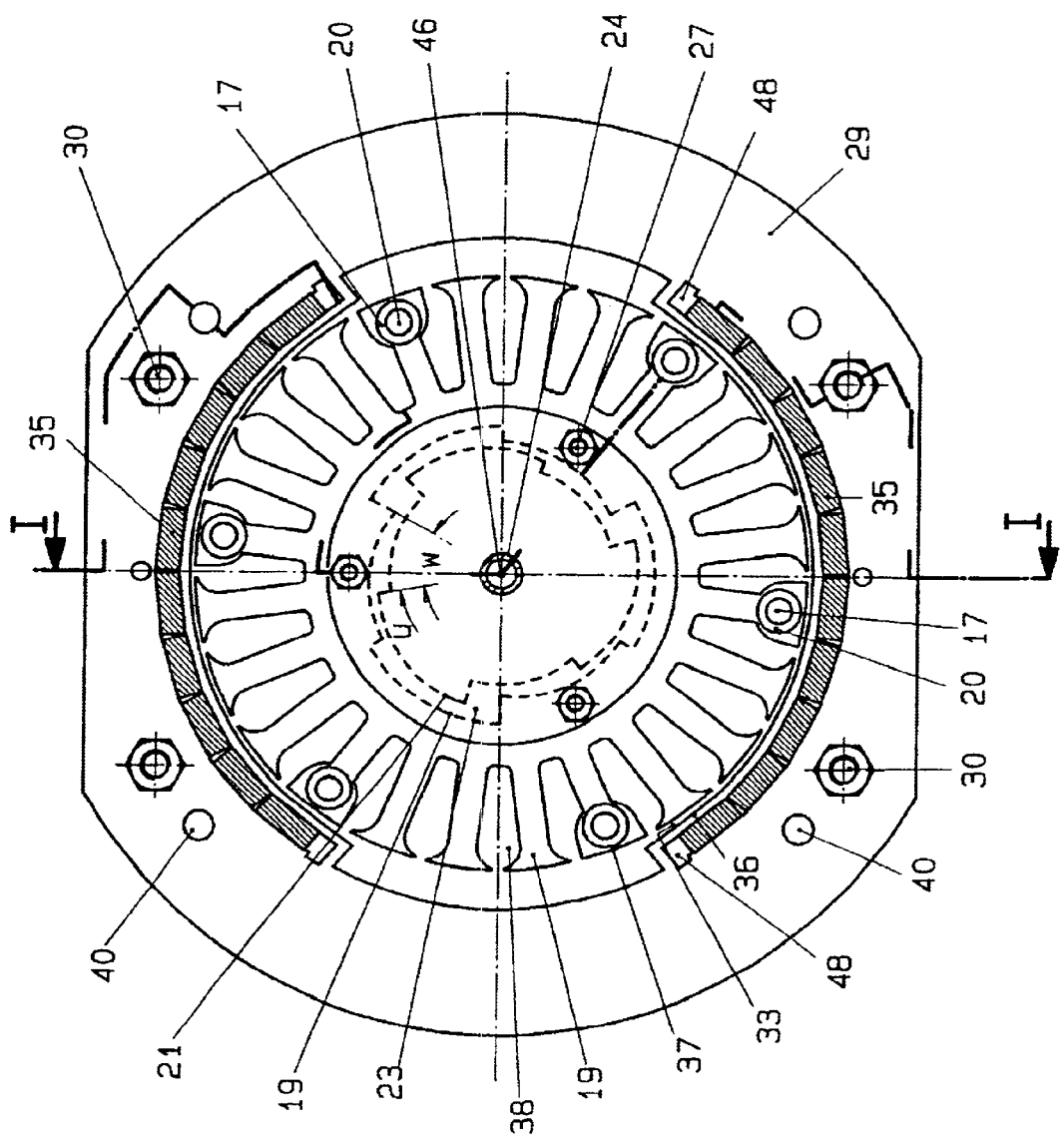
Figure 3:
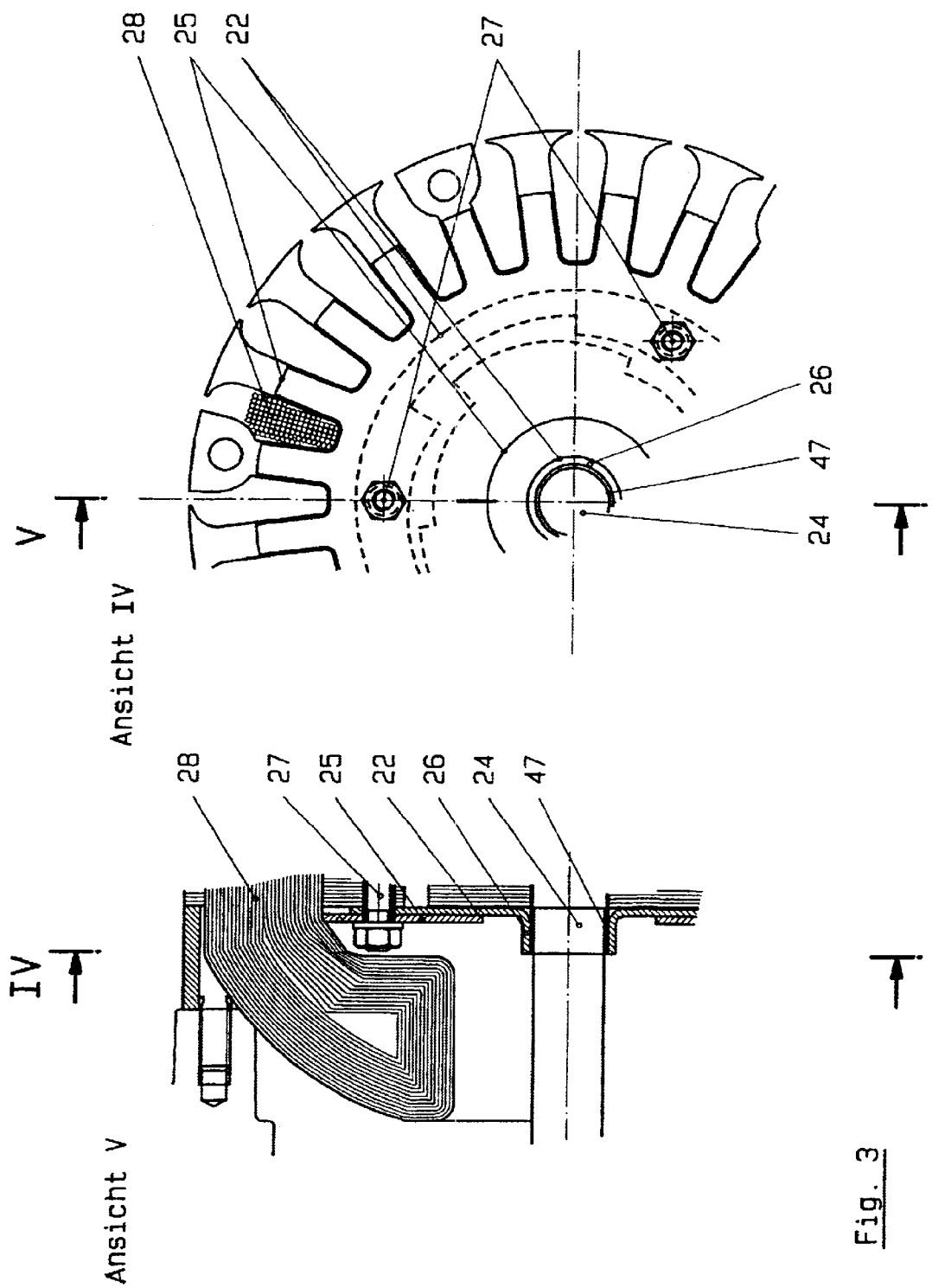
Figure 4:
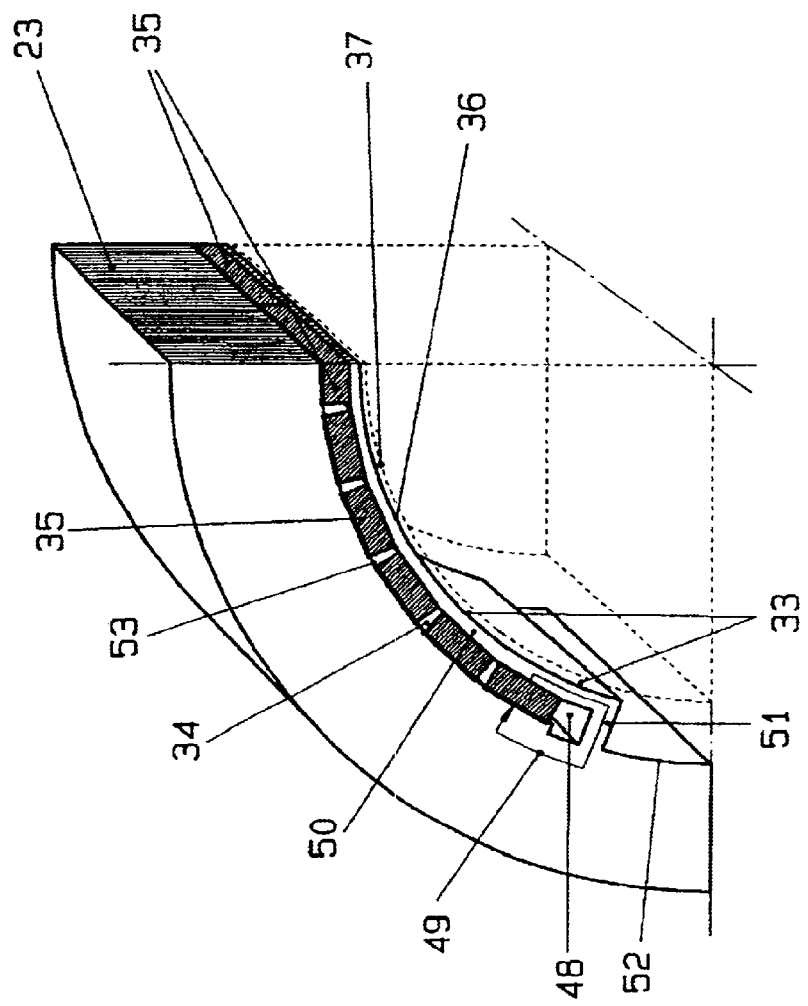
Figure 5:
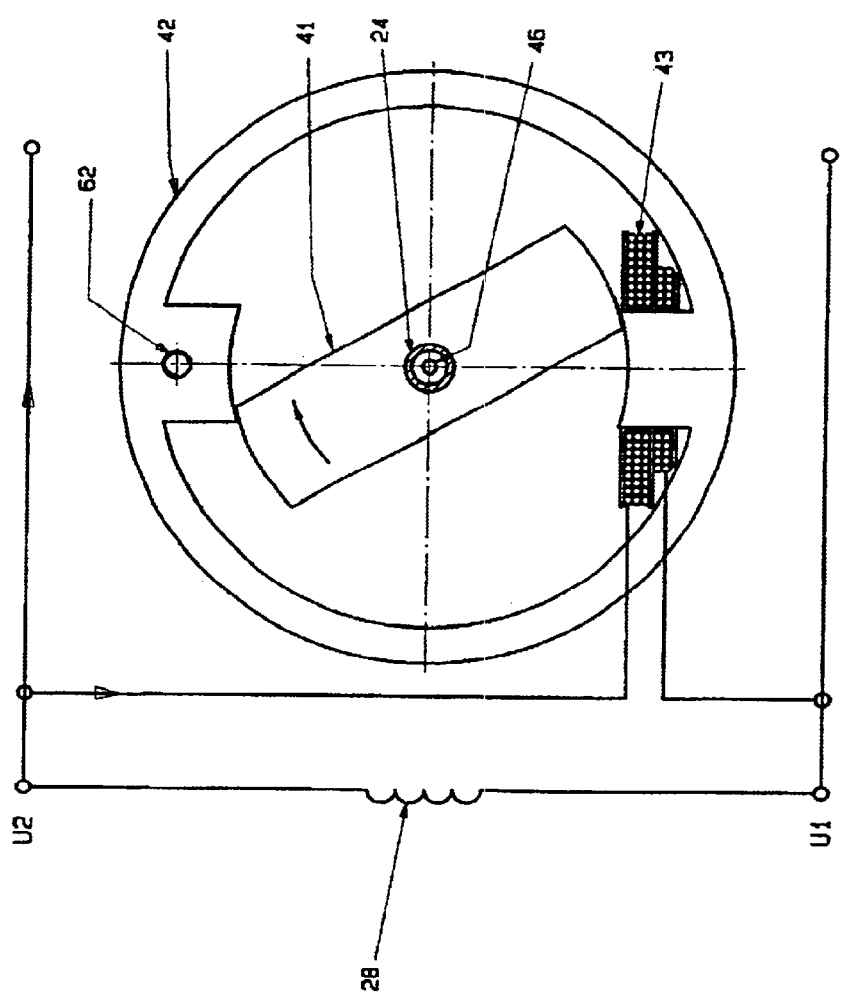

In the following, an exemplary embodiment of the invention will be explained on the basis of the drawing. This shows:

FIG. 1 an axial cross-section through a motor/generator unit according to Section I—I of FIG. 2, FIG. 2 a view of the stator and the rotor of the motor generator unit according to Section II—II of FIG. 1, FIG. 3 a partially axial view of the stator, on a larger scale, corresponding to FIG. 2, FIG. 4 a three-dimensional portion of the rotor with permanent magnets, and FIG. 5 a view of the voltage regulator according to Section V—V of FIG. 1.

The electrical machine forming a power generator as shown in FIGS. 1 to 3 relates to a unit composed of a drive motor and a synchronous generator. Preferably, a diesel engine is used as the drive motor, but only the connection-side end of its crankshaft 1 is shown with a broken line. On the face of the crankshaft 1, a fan wheel 2 is attached by means of screws 3. The fan wheel 2 possesses blades 4 to produce an air flow in accordance with arrow S1, for cooling the motor, where the inflowing air according to arrow S2 corresponds to the cooling air flowing out of the generator housing after generator cooling. As shown in FIG. 1, the generator housing lid 9 that is provided on the (current) outflow side possesses intake openings for the cooling air that flows in according to arrows L. In order for this cooling air flow to achieve its full cooling effect in the generator housing 8, the protective hood 14 possesses one or more inlet openings for the cooling air, with an appropriate size (not shown).

A connection housing 5 on the motor side encloses the space in which the fan wheel 2 is housed, radially to the outside; it is open on both sides and, on its side opposite the motor, possesses a ring flange 6 with threaded bores for screwing in attachment screws 7 for connecting the cylindrical generator housing 8, where it is practical if the latter is made of sheet metal, in which flange the housing is clamped in place on both faces, over a flat area. The attachment screws 7 are arranged resting against the inside of the generator housing 8, distributed over its circumference, and pass through the entire housing length. On the outflow side, the left end of the generator housing 8 in the drawing, a generator housing lid 9 is provided, which has an inside lid ring 10 with spokes that project radially inward, to which the stator 11 of the generator is attached. With their outflow-side ends, the shafts of the attachment screws 7 project through bores in the generator housing lid 9; at their free threaded ends 12, screw bolts 13 are screwed on, which serve to attach the generator housing 8 to the generator housing lid 9 as well as to attach the protective hood 14 by means of short screws 15; these are screwed in from the outside, through corresponding bores in the protective hood 14, into threaded bores of the facing ends of the screw bolts 13. The protective hood 14 covers the related free end of the generator housing lid 9 from the outside, with its edge segment 16 that forms the open end.

While eight attachment screws 7 are provided according to the present embodiment, distributed over the circumference, six stator screws 17 are sufficient to attach the stator to the inside lid ring 10, which screws are passed through bores of the sheet-metal package of an outside stator part 19 and are screwed into the lid ring 10 via spacer sleeves 20 between the inside lid ring 10 and the facing side of the outside stator part 19. In this way, the outside stator part 19 is fixed firmly in place on the housing, where the sheet-metal package that forms the outside stator part 19 is secured together by the stator screws 17.

The sheet-metal package that forms an inside stator part 21 is arranged on a hollow shaft 24, so as to rotate with it. The hollow shaft 24 is connected with a torsion rod 46 that is arranged in the shaft axis with pre-stress, via its end cap 60. It is mounted to rotate on bearing bushings 47 In bearing flanges 26 of sheathing plates 22, which are arranged on opposite faces of the sheet-metal package. The end of the torsion rod 46 that lies opposite the end cap 60 is fixed in place on the housing via a rigid rod support 44. Its attachment eye 61 is seated on a screw 62, which secures the sheet-metal package of the iron yoke 42 together. The sheathing plates 22 cover a control air gap 23 between the inside stator part 21 and the outside stator part 19. Since the sheet-metal package that forms the inside stator part 21 is therefore seated on the hollow shaft 24 so as to rotate with it, it also performs its rotation for the purpose of the desired constant regulation of the generator voltage. Adjustment of the inside stator part 21 relative to the outside stator part 19 for the purpose of regulating the generator voltage will be described in further detail below.

The view according to FIG. 2 shows not only the contour of the sheet-metal package that forms the rotor 29, but also the contour of the sheet-metal packages that form the stator, which packages have cut-outs 38 to hold the winding wires of the rotary current winding 28 of the generator, in the region of the outside stator part 19; it does not show the insulation plate 25 shown in FIG. 1, which was left out in order to improve the view. The outside stator part 19 is attached to the inside lid ring 10 shown in FIG. 1, by means of stator screws 17 passed through bores 39 in its sheet-metal package. In accordance with the selected section line, one can also see the spacer sleeves 20, which support the sheet-metal package of the outside stator part 19 against the inside lid ring 10.

Three holding screws 27 serve to center the inside stator part 21 within the outside stator part 19, by means of lateral sheathing plates 22, in the bearing flanges 26 of which the hollow shaft 24 is mounted with the sheet-metal package of the inside stator part 21.

The sheathing plates 22 are also covered by an insulation plate 25, in each instance, towards the outside, in the region of the control air gap 23, which serves to provide electrical insulation of the rotary current winding 28 of the generator, as well as of three holding screws 27 arranged distributed over the circumference, from the sheathing plate 22. The holding screws 27 run through bores in the sheet-metal package that forms the outside stator part 19. They are insulated from the sheet-metal package by means of insulation sleeves, and center the inside stator part 21 relative to the outside stator part 19 via the sheathing plates 22.

The stator 11 is surrounded by the rotor 29, which is also composed of a sheet-metal package, which is secured by means of clamping screws 30, which are screwed into corresponding threaded bores of the fan wheel 2 with a motor-side threaded end 31. Support sleeves 32 pushed onto the clamping screws 30 are secured between the fan wheel and the related side of the rotor 29. In this way, the rotor 29 is connected with the fan wheel 2 so as to rotate with it. On its inside circumference, it forms a narrow air gap 33, with a width of approximately 2 mm, relative to the stator 11. In addition, the rotor 29 has approximately cylindrical pockets 34 that go through in the axial direction, and run within two pole segments, into which magnet elements 35 in the form of narrow ingot-shaped rods are inserted from both sides, specifically, in the present example, as is evident from FIG. 2, two rows of ten magnet elements 35, in each instance, arranged next to one another, which are responsible for the magnetic excitation of the generator. In the region of the pockets 34, the inner contour line 36 of the circumference wall 50 of the rotor 29, which delimits the pockets 34 radially towards the inside, forms the narrow air gap 33, together with the outer contour line 37 of the stator 11. Bores 40 in the rotor plates serve for installation of a starter (not shown).

In accordance with FIGS. 2 and 4, the magnet elements 35 are pushed into the pockets 34 axially, so that they form the two poles lying next to one another, distributed in polygon shape. The subdivision of the permanent magnets for the poles into small magnet elements 35 allows them to be produced in economically efficient manner; their installation is greatly facilitated by means of a suitable magnetic ground 49, because in this way the mutual repulsion of adjacent magnet elements 35 is practically eliminated. The individual magnet elements 35 can be pushed into the pockets 34 practically without any force. In this connection, no special attachment of the magnet elements 35 is required, since they are held in the axial direction by their magnetic forces during operation, and are supported in the pockets, viewed in the radial direction, so that they can easily withstand the centrifugal forces that occur during operation.

In the three-dimensional representation of the magnet arrangement according to FIG. 4, a cavity 48 is provided at the end of the cut-out in which the magnet elements 35 are seated. Without this cavity 48, the extraordinarily great flow density in this region would result in magnetic reversal in the case of a surge short-circuit of the generator, and therefore in destruction of the outside magnet element 35. By structuring the cavity 48 with a defined magnetic ground 49, this magnetic reversal can be prevented. The cavity 48 is formed by an extension of the inside circumference wall 50 of the pockets 34 and a bridge 51 adjacent to the pole gap 52, through which the magnetic ground 49 runs. Ribs 53 that run axially on the insides of the pockets 34 define the distances between the magnet elements 35.

FIG. 3 shows an enlarged portion of FIG. 2, to make the illustration more clear, where parts that agree with one another are designated with the same reference symbol. Insulation plate 25 and sheathing plate 22, which serves to position the inside stator part 21, are indicated with reference lines at the outside and inside contour in FIG. 3, in each instance. The bearing bushing 47 is shown from the face side. In a portion 38 of the outside stator part 19, winding wires of the rotary current winding 28 are shown in cross-section.

The changeable control air gap 23 between the outside stator part 19 and the inside stator part 21 is essential for the principle of functioning of the voltage regulation of the generator. The circumference surfaces of the inside stator part 21 that are adjacent to the control air gap 23, on the one hand, and those of the outside stator part 19, on the other hand, are structured with three segments over the circumference, where the three individual segments have projecting circumference segments that run approximately in screw shape, deviating from the circular shape. For example, the control air gap 23 becomes narrower, if one turns the inside stator part 21 relative to the outside stator part 19, in the clockwise direction, in accordance with the arrow U (FIG. 2), starting from the position shown with broken lines, where the end position is reached approximately at a path of rotation in accordance with the angle w. In this end position, the control air gap 23 is the smallest it can be.

By turning the inside rotor part 21 relative to the outside rotor part 19, the geometry of the control air gap 23 and therefore the magnetic resistance in the stator 11 are changed. This circumstance is utilized in the present permanently excited synchronous machine to regulate the voltage. By changing the magnetic flow as described, it is possible to regulate the induced voltage, where there is a direct proportionality between the latter and the magnetic flow. Because of the fact that the inside stator part 21 is seated on a hollow shaft 24 with a pre-stressed torsion rod 46, torsion forces that counteract the force effects of the magnetic field on the inside stator part 21 are mobilized, so that the rotation of the inside stator part 21 relative to the outside stator part 19 that is applied for the purpose of voltage regulation can take place almost without force, using a rotary magnet 41. However, this presumes that the torsion pre-stress is adapted to the magnetic resetting force.

The rotary magnet 41 shown in FIGS. 1 and 5 is arranged on the inside of an iron yoke 42, which carries a winding 43 controlled by the generator terminal voltage. In this connection, voltage variations at the generator winding result in a rotation of the rotary magnet 41, and thereby cause the desired constant regulation of the voltage by means of a relative rotation between the two stator parts. In accordance with FIG. 1, the rotary magnet 41 is over-mounted on the related end of the hollow shaft 24, which in turn is connected to rotate with the inside stator part 21. The rotary magnet 41 is seated centered on a bearing segment 45 at the end of the hollow shaft 24, and is pressed against a shoulder of the hollow shaft 24 there. Preferably, the rotary magnet 41 with the related yoke 42 are each formed from sheet metal.

In accordance with FIG. 5, the electrical circuit for activation of the rotary magnet 41 is also drawn in. The winding 43, which is affixed at one of the poles of the iron yoke 42, is applied to the terminal voltage U1, U2 of the generator winding 28. In this connection, the magnetic flow is directly proportional to the induced voltage and controls the rotation of the rotary magnet 41 and also of the inside stator part 21, via the hollow shaft 24, causing the geometry of the control air gap 23 and therefore the magnetic resistance in the stator 11 to be changed. The result is simple regulation of the terminal voltage of the generator, independent of the power factor cos φ.

What is claimed is:

1. Power generator unit comprising:
    a synchronous generator and a piston internal combustion engine as a drive, said generator having a rotor and a stator,
    said rotor provided with a pair of pole regions having permanent magnets arranged in the pole regions, for the excitation of the generator, and
    a rotary current winding in the stator,
    wherein holder pockets that are open in the axial direction at least on one side are formed in the pole regions of the rotor, said holder pockets bordering on an air gap formed with the stator with a cylindrical circumference wall, and
    wherein the permanent magnets of the pole regions are each formed by a plurality of magnet elements, which are arranged next to one another within the holder pockets in the circumferential direction.

2. Power generator unit according to claim 1, wherein the magnet elements are arranged in the holder pockets in the axial direction, in at least two rows behind one another.

3. Power generator unit according to claim 1, wherein the rotor is structured as an external rotor.

4. Power generator unit according to claim 1, wherein the holder pockets are continuous in the axial direction and open, and a thickness of the circumference wall corresponds to about half a radial thickness of the magnet elements.

5. Power generator unit according to claim 1, wherein the holder pockets extended on both sides beyond the last arranged magnet element to form a cavity.

6. Power generator unit according to claim 5, wherein the circumference wall continues in the region of the cavity, where a thickness of the circumference wall is sized so that no de-magnetization of the magnet elements close to the edge will occur as the result of a surge short-circuit.

7. Power generator unit according to claim 1, wherein the holder pockets border on an intermediate pole segment of the rotor with a radial bridge.

8. Power generator unit according to claim 1, wherein radial inside surfaces of the holder pockets are polygonal, corresponding to the shape of the magnet elements.

9. Power generator unit according to claim 1, wherein at least on an inside surface of the holder pockets that lies opposite the circumference wall, axial ribs are provided to define distances between adjacent magnet elements.

10. Power generator unit according to claim 1, wherein the magnet elements are adhesively attached to an inside surface of the holder pockets.

11. Power generator unit according to claim 1, wherein the holder pockets are covered with a lid at their axially opposite faces.

12. Power generator unit according to claim 1, wherein the holder pockets are subdivided into individual drawers that approximately correspond to the cross-section of a magnet element, in each instance, by means of axial partitions.

13. Power generator unit according to claim 1, wherein the magnet elements are rectangular in cross-section.

14. Power generator unit according to claim 1, wherein the magnet elements are ring segments in cross-section.

15. Power generator unit according to claim 1, wherein the stator is positioned inside the rotor.

* * * * *